United States Patent
Hooper et al.

(10) Patent No.: US 12,479,374 B2
(45) Date of Patent: Nov. 25, 2025

(54) CARGO BOX TOOL HOLDER CLAMP

(71) Applicant: DEERE & COMPANY, Moline, IL (US)

(72) Inventors: Adam C. Hooper, Iron Ridge, WI (US); Ganesh B. Sonawane, Dhule (IN)

(73) Assignee: DEERE & COMPANY, Moline, IL (US)

( * ) Notice: Subject to any disclaimer, the term of this patent is extended or adjusted under 35 U.S.C. 154(b) by 266 days.

(21) Appl. No.: 18/468,833

(22) Filed: Sep. 18, 2023

(65) Prior Publication Data
US 2025/0091527 A1    Mar. 20, 2025

(51) Int. Cl.
*B60R 11/06* (2006.01)
*B60R 11/00* (2006.01)
*B62D 33/02* (2006.01)

(52) U.S. Cl.
CPC ........ *B60R 11/06* (2013.01); *B60R 2011/0059* (2013.01); *B62D 33/0207* (2013.01)

(58) Field of Classification Search
CPC ........ B60R 9/06; B60R 11/06; B62D 33/0207
USPC ................. 224/402–405; 296/3, 37.6, 43
See application file for complete search history.

(56) References Cited

U.S. PATENT DOCUMENTS

| | | |
|---|---|---|
| 6,176,658 B1 | 1/2001 | Rowe |
| 7,055,454 B1 | 6/2006 | Whiting et al. |
| 7,222,582 B1 | 5/2007 | Whiting et al. |
| 7,938,604 B2 | 5/2011 | Toutant et al. |
| 7,975,640 B1 | 7/2011 | Whiting et al. |
| 8,267,034 B2 | 9/2012 | Whiting et al. |
| 8,777,531 B2 | 7/2014 | Massicotte et al. |
| 8,875,830 B2 | 11/2014 | Massicotte et al. |
| 9,073,495 B2 | 7/2015 | Toutant |
| 9,493,123 B2 | 11/2016 | Martin |
| 9,505,335 B2 | 11/2016 | Massicotte et al. |
| 9,511,704 B2 | 12/2016 | Massicotte et al. |
| 10,023,247 B2 | 7/2018 | Diller et al. |
| 11,155,216 B2 | 10/2021 | Benedict et al. |
| 11,654,978 B2 | 5/2023 | Smith |

OTHER PUBLICATIONS

Honda Pro-Connect Latch, Clamp, Mount, pp. 1-2 [online], [retrieved on Jul. 28, 2023]. Retrieved from the Internet: <URL: https://store.hondasxs.com/products/honda-pro-connect-latch-clamp-mount>.

*Primary Examiner* — Justin M Larson

(57) ABSTRACT

A cargo box tool holder clamp includes a post having a first end slideable into a stake pocket in a side wall of a utility vehicle cargo bed, and a sleeve sliding over a second end of the post. A plurality of tool holders may be mounted to the sleeve. A pivot member with a hook shape locks the sleeve to a rail above the side wall in an engaged position, and unlocks the sleeve from the rail in a disengaged position.

11 Claims, 3 Drawing Sheets

CARGO BOX TOOL HOLDER CLAMP

FIELD OF THE INVENTION

This invention relates generally to tool holders on cargo boxes of off road utility vehicles.

BACKGROUND OF THE INVENTION

Tool holders may be installed on off road utility vehicle cargo boxes, to carry tools such as shovels, hand tools, and string trimmers. Tool holders may include posts that may be inserted into stake pockets or recesses in the side of the cargo box, and then secured with expansion anchors, bolts or other threaded fasteners. For example, U.S. Pat. No. 7,055,454 for Vehicle Expansion Retainer assigned to Polaris Industries Inc., 8777531 for Anchor assigned to Bombardier Recreational Products Inc., and 11155216 for Retaining Device for Vehicle Racks assigned to Arctic Cat Inc. relate to expansion anchors or retainers for securing tool holders to stake pockets of utility vehicle cargo boxes. Tool holders also may be secured to rails along the top of a utility vehicle cargo box. For example, U.S. Pat. No. 7,938,604 for Attachment Mounting Device for Utility Vehicle Cargo Box, and 9073495 for Attachment Clamp for Utility Vehicle Cargo Box, both assigned to Deere & Company, relate to tool holders secured to cargo box side rails.

A cargo box tool holder is needed that may be installed and removed from a utility vehicle cargo box without expansion anchors, bolts or other threaded fasteners. A cargo box tool holder is needed that may be secured and removed from a stake pocket and rail of a utility vehicle cargo box without tools.

SUMMARY OF THE INVENTION

A cargo box tool holder clamp includes a post having a first end inserted into a stake pocket of a cargo box and a second end extending up from the stake pocket to a rail above the cargo box. A sleeve may be inserted over the second end and may extend above the rail. A pivot member may be mounted to the sleeve and is pivotable between an engaged position around the rail holding the post in the stake pocket and a disengaged position for releasing the post from the stake pocket.

DESCRIPTION OF THE PREFERRED EMBODIMENT

Figure 1:
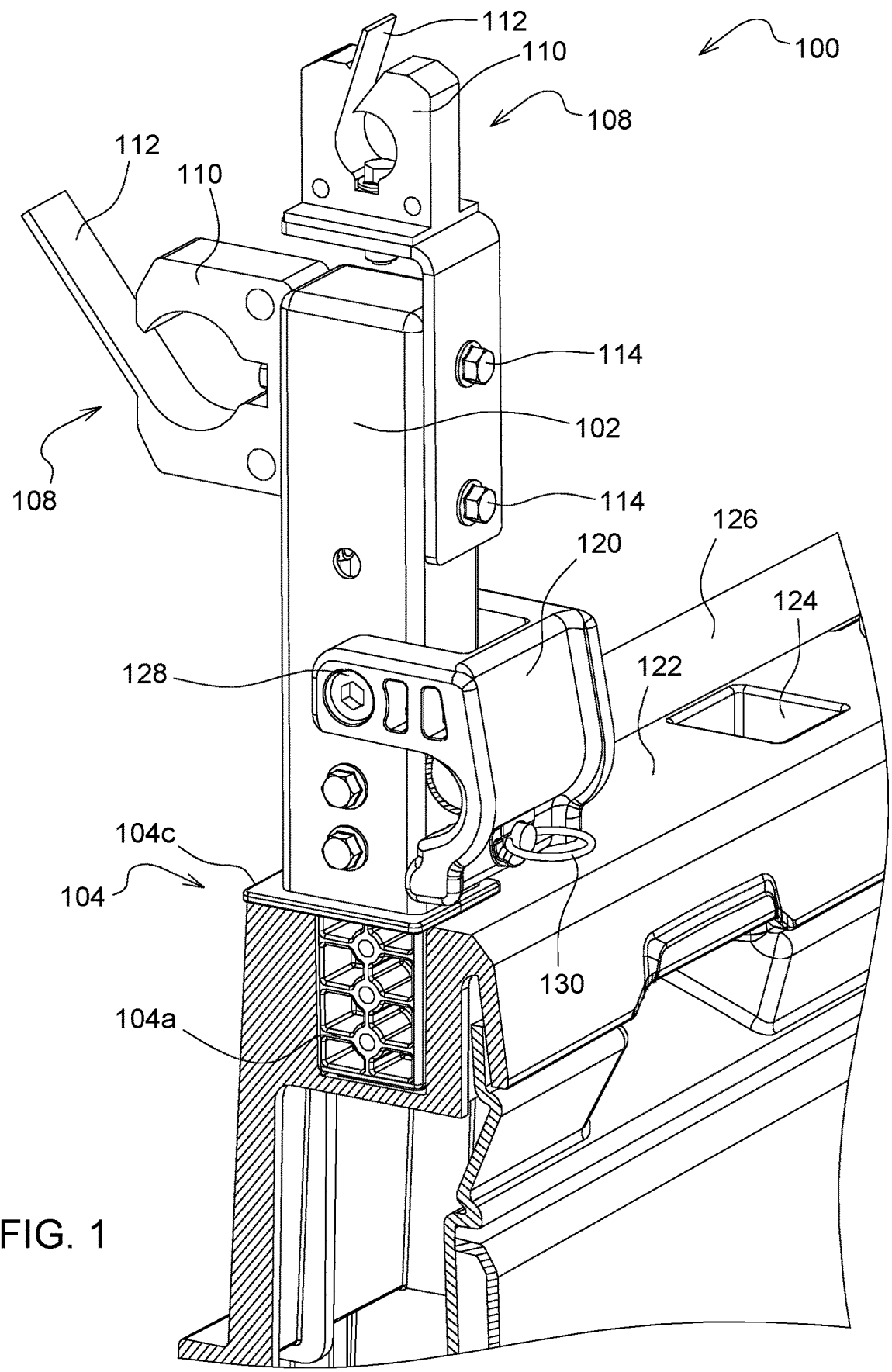
FIG. 1 is a perspective view, partially in section, of a cargo box tool holder clamp installed on a cargo box according to a first embodiment of the invention.
Figure 2:
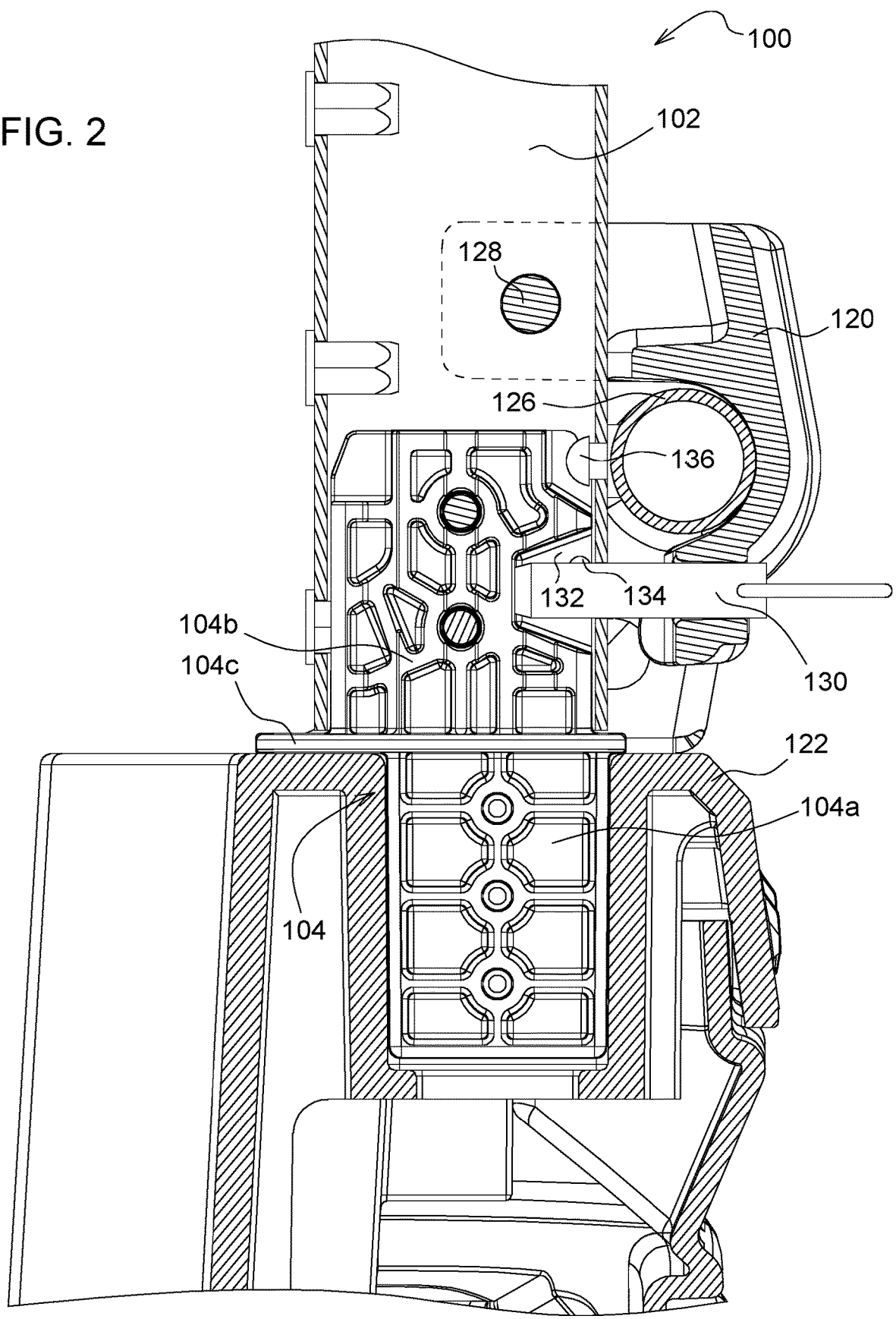
FIG. 2 is a side sectional view of a cargo box tool holder clamp installed on a cargo box according to a first embodiment of the invention.
Figure 3:
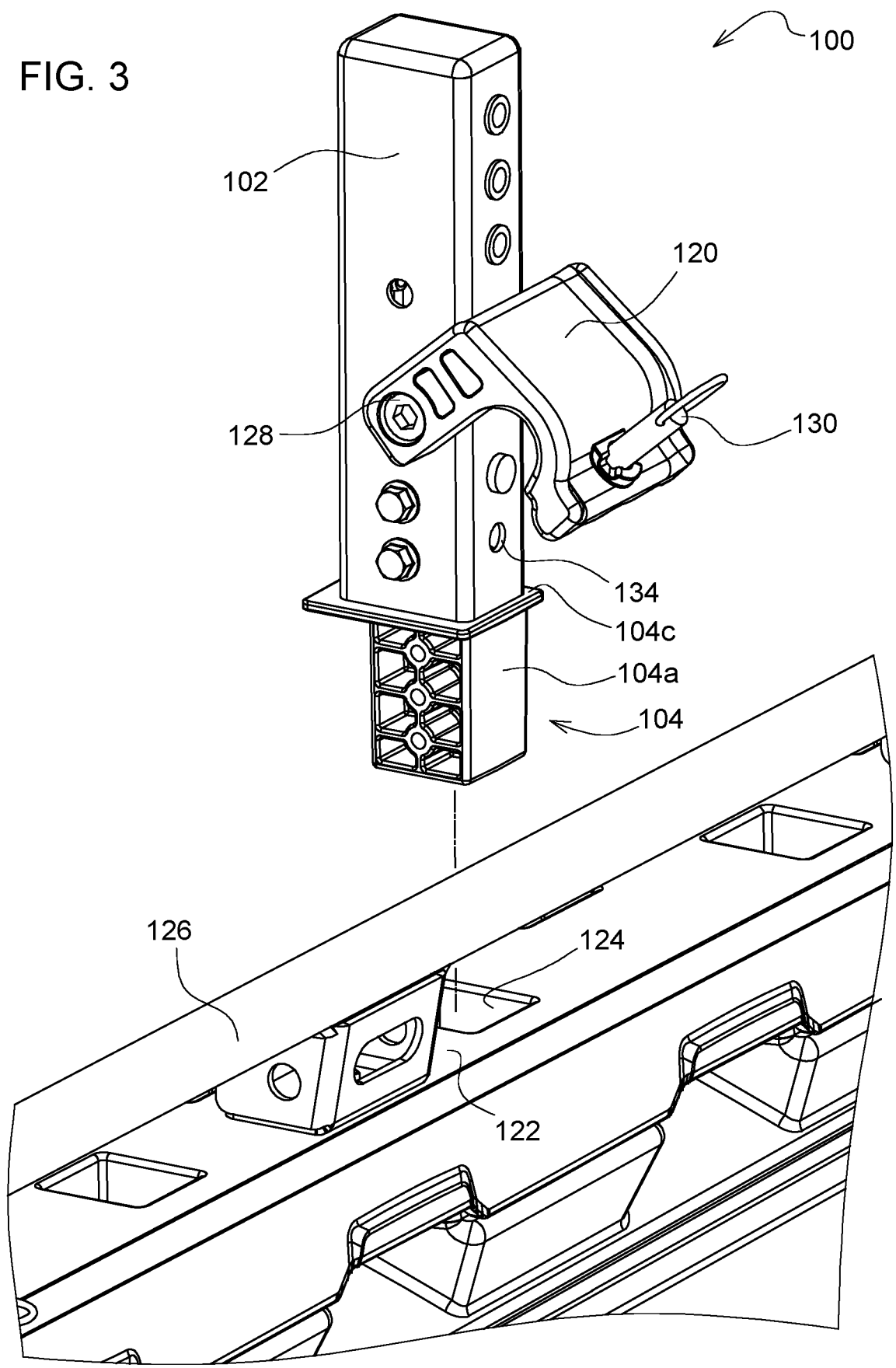
FIG. 3 is a perspective view of a cargo box tool holder clamp off a cargo box according to a first embodiment of the invention.

In one embodiment shown in FIGS. 1-3, cargo box tool holder clamp 100 may be installed on utility vehicle cargo box side wall 122. Cargo box tool holder clamp 100 may include post 104 with first or lower end 104a that fits into cargo box stake pocket 124, second or upper end 104b that slides into stake tube or sleeve 102, and shoulder plate 104c between the two ends and may abut the cargo box side wall when installed. Post 104 may be an injection molded plastic component designed to fracture if the cargo box tool holder clamp is overloaded or subject to excessive side forces, before substantial deformation, bending or fracture of the cargo box, stake pocket or any other component of the cargo box tool holder clamp. FIG. 2 shows post 104 wherein the first or lower end is inserted in stake pocket 124, and the second or upper end extends upwardly and terminates adjacent cargo box rail 126. Stake tube or sleeve 102 may extend further above the cargo box rail where it provides for mounting of one or more tool holders 108 above the rail.

In one embodiment, cargo box tool holder clamp 100 may include a plurality of threaded fasteners 114 which may extend through holes in stake tube or sleeve 102 and through one or more tool holders 108. Each tool holder 108 may include tool handle grip 110 and latch or strap 112 which may close around the handle. A cargo box may have multiple stake pockets, and multiple cargo box tool holder clamps may be mounted to a cargo box, and each cargo box tool holder clamp may have a plurality of threaded holes so that two or more tool holders may be mounted to each clamp.

In one embodiment, cargo box tool holder clamp 100 may include pivot member 120 for engaging cargo box rail 126. Pivot bolt 128 may be inserted through holes in stake tube or sleeve 102 above the rail, to provide a generally horizontal pivot axis for pivot member 120 relative to the stake tube or sleeve. The pivot member may be manually pivoted between an engaged position around the rail to hold the post in the stake pocket, and a disengaged position allowing the post to be removed manually from the stake pocket. The pivot member may have a hook shape that fits around the cylindrical surface of the rail in the engaged position, and also may flex or have a detent which may snap and lock around the rail in the engaged position.

Optionally, cargo box tool holder clamp may include quick release pin 130 which may be slideably inserted through pivot member hook 120 and into recess 132 in the side of post 104. Quick release pin 130 may help prevent the cargo box tool holder clamp from moving out of the stake pocket. Quick release pin 130 may have a spring loaded ball detent 134 to hold the pin in the locked position. Quick release pin 130 also may include a handle on the outer end that may be manually gripped to remove the pin from the locked position. Additionally, rubber bumper 136 may be mounted to sleeve 102 to provide contact and load transfer between the sleeve and rail 126.

Having described the preferred embodiment, it will become apparent that various modifications can be made without departing from the scope of the invention as defined in the accompanying claims.

The invention claimed is:

1. A cargo box tool holder clamp, comprising:
    a post having a first end inserted into a stake pocket of a cargo box and a second end extending up from the stake pocket to a rail above the cargo box;
    a sleeve inserted over the second end and extending above the rail; and
    a pivot member mounted to the sleeve and pivotable between an engaged position around the rail holding the post in the stake pocket and a disengaged position for releasing the post from the stake pocket.

2. The cargo box tool holder clamp of claim 1 wherein the post includes a shoulder plate between the first end and the second end of the post.

3. The cargo box tool holder clamp of claim 1 further comprising a quick release pin slideable through the clamp to a locked position holding the post in the stake pocket.

4. The cargo box tool holder clamp of claim 3 further comprising a detent ball holding the quick release pin in the locked position.

5. A cargo box tool holder clamp, comprising:
a post having a first end slideable into a stake pocket in a side wall of a utility vehicle cargo bed;
a sleeve sliding over a second end of the post;
a plurality of tool holders mounted to the sleeve; and
a pivot member with a hook shape configured to lock the sleeve to a rail above the side wall in an engaged position, and unlock the sleeve from the rail in a disengaged position.

6. The cargo box tool holder clamp of claim 5 wherein the post is injection molded plastic.

7. The cargo box tool holder clamp of claim 5 further comprising a manually removeable quick release member between the pivot member and post.

8. A cargo box tool holder clamp in combination with a utility vehicle having a cargo box, cargo box rail, and cargo box stake pocket, comprising:
a post with a sleeve around an upper end thereof;
a pivot member mounted to the sleeve and pivotable to engage a cargo box rail;
a plurality of tool holders mounted to the sleeve; and
a quick release pin slideable to lock the pivot member to the sleeve and the post.

9. The cargo box tool holder clamp of claim 8 wherein the post has an upper end that terminates at the cargo box rail.

10. The cargo box tool holder clamp of claim 8 wherein the post engages a cargo box stake pocket.

11. The cargo box tool holder clamp of claim 8 wherein the pivot member includes a hook shape that engages the cargo box rail.

\* \* \* \* \*